United States Patent Office 3,503,431
Patented Mar. 31, 1970

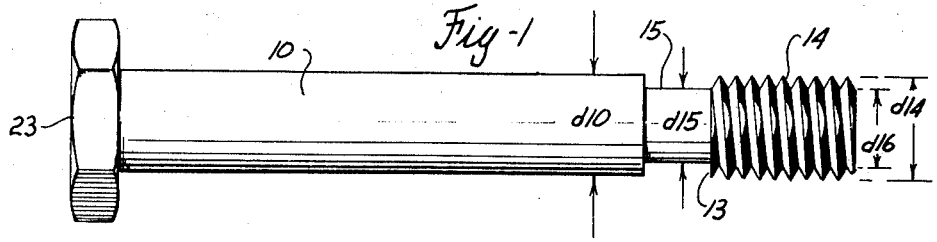
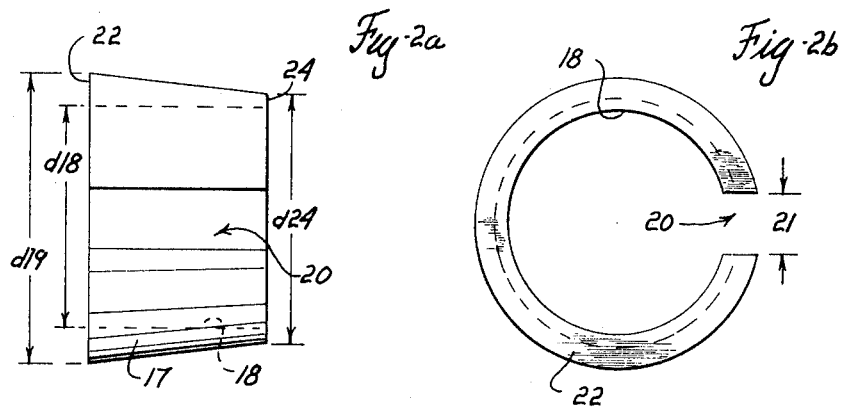
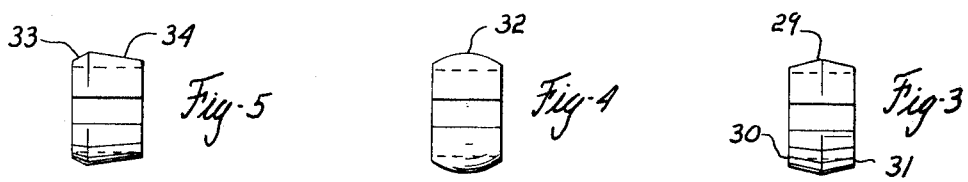
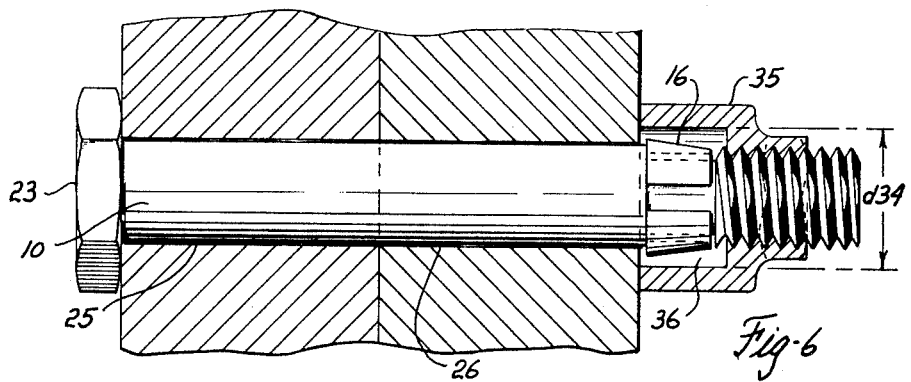
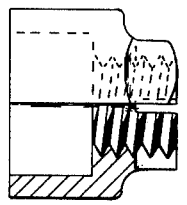
INVENTOR.
Joseph P. Villo
BY Roger B. Whiteside
Synnestvedt & Lechner
ATTORNEYS

3,503,431
SAFETY BOLT
Joseph P. Villo, Rydal, Pa., and Roger B. Whiteside, Cinnaminson, N.J., assignors to Standard Pressed Steel Co., Jenkintown, Pa., a corporation of Pennsylvania
Continuation of application Ser. No. 517,549, Dec. 30, 1965. This application Dec. 16, 1968, Ser. No. 785,451
Int. Cl. F16b 43/00
U.S. Cl. 151—69                                       9 Claims

ABSTRACT OF THE DISCLOSURE

A fastener assembly including a self-retained bolt having a threaded end portion with an annular groove adjacent thereto and a spring collar mounted within the groove and a nut element having a counterbored bearing face to receive the collar. The spring collar comprises a pair of oppositely disposed frusto conic sections which facilitate installation and withdrawal of the bolt collar assembly in a workpiece.

---

This application is a continuation of Ser. No. 517,549, filed Dec. 30, 1965, now abandoned.

This invention relates to a bolt assembly that will be retained in the bolt hole in the event the nut backs off due to vibration or otherwise becomes separated or malfunctions.

The self-retained bolt assembly of the invention includes a bolt and a circumferentially compressible spring collar carried by the bolt in an annular groove positioned at or adjacent the thread runout. The bolt diameter along the groove is less than the shank diameter. The external surface of the collar includes first and second frusto conic sections positioned with the first frusto conic section having a top defining an edge of the collar which is presented toward the bolt head and the second frusto conic section having a top defining a second edge of the collar which is presented toward the bolt threads. The diameters of the tops of the frusto conic sections are equal to each other and when the collar is uncompressed, the diameters of the tops of the frusto conic sections are equal to or slightly less than the bolt shank diameter. The bore diameter of the uncompressed collar is larger than the groove diameter but smaller than the major bolt thread diameter. The maximum external diameter of the circumferentially uncompressed collar being greater than the bolt shank diameter and the maximum diameter of the circumferentially compressed collar is no greater than the shank diameter of the bolt. The collar has a slot through the axial extent thereof of sufficient width to provide for the circumferential compressibility.

This assembly also includes a nut counterbored at its bearing face to a diameter greater than a maximum external diameter of the uncompressed collar.

Further details of the construction of bolt assemblies according to the invention, their operation and advantages will appear in the following drawings and the ensuing description.

In the drawings:

FIGURE 1 illustrates a bolt.

FIGURES 2a and 2b are side and end views of a collar and FIGURES 3, 4 and 5 are side views of other collar embodiments.

FIGURE 6 is a sectional view illustrating the bolt assembly installed so as to hold a pair of workpieces having aligned apertures.

FIGURE 7 is a nut that can be employed in the novel combination of this invention.

In FIGURE 1, the bolt shank 10 has a diameter $d_{10}$, the length of the shank is such that only the shank portions will be in bearing or subjected to shear when the bolt is installed. At the runout 13 of the threads 14, there is an annular groove 15. The diameter $d_{15}$ of the groove must be less than the shank diameter $d_{10}$ and in order to minimize the impairment of bolt strength the groove preferably has a uniform diameter along its length that is not greater than the minor diameter $d_{16}$ of the bolt threads; the shank and the groove being concentric.

As can be seen in FIGURE 6, a collar 16 is carried in the groove 15. This collar is a spring member and can be circumferentially compressed to permit it to pass through the aperture in which the bolt is to be installed. After passing through the aperture the spring member will return to its uncompressed state and circumferentially expand to a point where it is larger than the aperture through which it has passed, such expansion positions and retains the bolt in the aperture even though the bolt is disengaged from the nut.

FIGURES 2a and 2b illustrate one embodiment of a collar adapted for use in the present invention. The collar 17 is provided with a straight bore 18. The diameter $d_{18}$ of the collar bore (when the collar is uncompressed) is greater than the diameter $d_{15}$ of the groove, but less than the major diameter $d_{14}$ of the bolt threads. The collar has a configuration such that its maximum external diameter $d_{19}$ when uncompressed is greater than the shank diameter $d_{10}$. To facilitate circumferential compression of the collar, it is provided with a continuous split 20 that extends through the collar wall into the bore and reaches from one end of the bore to the other. While functionally many slit configurations can be employed ease of manufacture installation calls for employment of a straight slit and preferably one aligned parallel to the collar bore axis. The external collar diameter $d_{19}$, the slit width 21, and the differential between the bore diameter $d_{18}$ and the groove diameter $d_{15}$ must be dimensioned to permit the requisite degree of circumferential contraction that is necessary to permit the collar when circumferentially compressed to pass through an aperture in which the bolt shank can be positioned—and in precision installation circumferential compression of the collar so that the maximum external diameter is not greater than the bolt shank diameter.

The collar illustrated in FIGURES 2a, 2b and 6 is in the form of a frustum of a cone. When installed on the bolt, the base or element of greater diameter 22 of the frustum should be positioned in the groove portions that are closest to the bolt head 23 and the frustum top 24 should be positioned in the groove portions that are closest to the bolt threads. To facilitate installation in a workpiece aperture without the use of special tools, the diameter $d_{24}$ of the frustum top even when the collar is uncompressed circumferentially, preferably should be equal to or slightly less than the bolt shank diameter.

This arrangement will permit installation of the bolt assembly in the aperture of a workpiece (for example the aligned apertures 25 and 26 of workpieces 27 and 28 in FIGURE 6) by manually pushing the bolt assembly through the opening with sufficient force to circumferentially compress the spring collar—the actual pressure to be employed will depend on the resiliency of the particular collar configuration. Because the base 22 of the frustum is of larger diameter than the bolt shank when the collar is uncompressed, it will (in any precision assembly) also be larger than the aperture of the workpiece in which the bolt is installed. Once installed, the bolt cannot be backed out through the bolt hole even if the nut is separated from the bolt. In order to withdraw such an assembly, it is necessary to slip a tool over the collar that will compress the collar to a size that will permit withdrawal of the bolt-collar assembly through the workpiece bore.

To permit manual removal without the use of special tools or chamfered workpiece bore holes and still retain a high degree of retentive function, the external surface of the spring collar can be given different configurations—for example, those shown in FIGURES 3, 4 and 5.

The spring collar illustrated in FIGURE 3 is a unitary element and has an external surface generally defined by two symmetrical conic frustums positioned base to base 29. When the frustum tops 30 and 31 of the uncompressed collar are of the same or smaller diameter than the bolt shank, the bolt-collar assembly can be inserted and withdrawn manually without using special tools to initially compress the collar.

In FIGURE 4, the spring collar is similar to that shown in FIGURE 3 except that the external surface 32 is spheroidal. If desired, the surface could be any surface of revolution generated about the bore axis that provides for a maximum external diameter that is greater than the shank diameter.

In FIGURE 5, the spring collar is a modified version of that shown in FIGURE 3, specifically the conic frustums are unsymmetrical, the altitude of the frustum portion 33 being less than the altitude of frustum portion 34. This arrangement varies the axial force which must be applied to install and withdraw the bolt-collar assembly. Usually, this embodiment is positioned with the shorter frustum in the groove portions closest to the bolt head and greater axial force is needed to withdraw the assembly than to install it.

The spring collar configurations of FIGURES 2, 3, 4 and 5 have been found to retain bolts after nut malfunctions even when the installation has been subjected to rather severe vibration—meeting or exceeding the standards prescribed by NAS 3350 and they all exhibit a high degree of reusability and when dimensioned in the preferred manner (i.e., the groove diameter not being greater than the minor diameter of the thread) the tensile strength is not adversely affected.

As illustrated in FIGURE 6, a companion nut 35 is used and is necessary to form a truly tight joint and in order not to compress the spring ring when loaded, the nut is counterbored at 36 to a diameter that will clear the maximum external diameter $d_{18}$ of the uncompressed spring collar and the depth of counterboring should be sufficient to clear the full length of the collar when the nut is installed in bearing engagement with the workpiece.

As an additional safety measure, the nut can be castellated as in FIGURE 7 and used with a retaining pin or wire passing through an aligned transverse bore in the bolt. As used herein, the term castellated nut also contemplates nuts having a transverse bore through the nut body adapted to receive a retaining pin or wire.

It will be noted that the spring collar will expand and serve to retain the bolt whenever it senses clearance.

The bolt and collar can be assembled before or after the threads are rolled. However, when collars are assembled on the bolts by expanding them over the threads, the collar diameter may be permanently deformed and it is necessary to restore them to their proper diameters by pushing the part into a bore hole of the desired proper diameter and working the collar therein sufficiently to overcome the deformation.

What is claimed is:

1. A fastener assembly comprising:
 a self-retained bolt including a bolt having a threaded shank and an enlarged head and a circumferentially compressible spring collar carried by said bolt in an annular groove positioned at or adjacent the thread runout, the bolt diameter along the groove being less than the shank diameter, the external surface of the collar including first and second frusto conic sections positioned base to base with said first frusto conic section having a top defining an edge of said collar which is presented toward the bolt head and said second frusto conic section having a top defining a second edge of said collar which is presented toward the bolt threads, the diameters of said tops of said frusto conic sections being equal to each other and when the collar is uncompressed being equal to or slightly less than the bolt shank diameter, the bore diameter of the uncompressed collar being larger than the groove diameter but smaller than the major thread diameter, the maximum external diameter of the uncompressed collar being greater than the shank diameter, the maximum external diameter of the circumferentially compressed collar is no greater than the shank diameter, and said collar having a slot throughout the axial extent thereof of sufficient width to provide for the circumferential compressibility;
 and a nut counterbored at its bearing face to a diameter greater than the maximum external diameter of the uncompressed collar.

2. A fastener assembly according to claim 1 wherein the nut is a castellated nut.

3. A joint comprising:
 a plurality of workpieces having aligned apertures passing through said workpieces;
 a self-retained bolt installed in said aligned apertures and including a bolt having a threaded shank and an enlarged head and a circumferentially compressible spring collar carried by said bolt in an annular groove positioned at or adjacent the thread runout, the bolt diameter along the groove being less than the shank diameter, the external surface of the collar including first and second frusto conic sections positioned base to base with said first frusto conic section having a top defining an edge of said collar which is presented toward the bolt head and said second frusto conic section having a top defining a second edge of said collar which is presented toward the bolt threads, the diameters of said tops of said frusto conic sections being equal to each other and when the collar is uncompressed being equal to or slightly less than the bolt shank diameter, the bore diameter of the uncompressed collar being larger than the groove diameter but smaller than the major thread diameter, the maximum external diameter of the uncompressed collar being greater than the shank diameter, the maximum external diameter of the circumferentially compressed collar is no greater than the shank diameter, and said collar having a slot throughout the axial extent thereof of sufficient width to provide for the circumferential compressibility, said bolt positioned so that the full shank length is in bearing and said collar is uncompressed;
 and a nut turned onto said self-retained bolt and holding said self-retained bolt in clamping engagement.

4. A fastener assembly according to claim 1 wherein the counterbore is of a depth such that the bearing face of the installed nut can bear against a workpiece without circumferentially compressing the collar.

5. A fastener assembly comprising:
 a self-retained bolt including a bolt having a threaded shank and an enlarged head and a circumferentially compressible spring collar carried by said bolt in an annular groove positioned at or adjacent the thread runout, the bolt diameter along the groove being less than the shank diameter the external surface of the collar including first and second frusto conic sections positioned with said first frusto conic section having a top defining an edge of said collar which is presented toward the bolt head and said second frusto conic section having a top defining a second edge of said collar which is presented toward the bolt threads, the diameters of said tops of said frusto conic sections being equal to each other and when the collar is uncompressed being equal to or slightly less than the bolt shank diameter, the bore diameter of the uncompressed collar being larger than the groove diameter but smaller than the major thread diameter, the maximum external diameter of the uncompressed collar being greater than the shank diameter, the maximum external diameter of the circumferentially compressed collar is no greater than the shank diameter, and said collar having a slot throughout the axial extent thereof of sufficient width to provide for the circumferential compressibility;

and a nut counterbored at its bearing face to a diameter greater than the maximum external diameter of the uncompressed collar.

6. A fastener assembly according to claim 5 wherein the nut is a castellated nut.

7. A joint comprising:
a plurality of workpieces having aligned apertures passing through said workpieces;
a self-retained bolt installed in said aligned apertures and including a bolt having a threaded shank and an enlarged head and a circumferentially compressible spring collar carried by said bolt in an annular groove positioned at or adjacent the thread runout, the bolt diameter along the groove being less than the shank diameter, the external surface of the collar including first and second frusto conic sections positioned with said first frusto conic section having a top defining an edge of said collar which is presented toward the bolt head and said second frusto conic section having a top defining a second edge of said collar which is presented toward the bolt threads, the diameters of said tops of said frusto conic sections being equal to each other and when the collar is uncompressed being equal to or slightly less than the bolt shank diameter, the bore diameter of the uncompressed collar being larger than the groove diameter but smaller than the major thread diameter, the maximum external diameter of the uncompressed collar being greater than the shank diameter, the maximum external diameter of the circumferentially compressed collar is no greater than the shank diameter, and said collar having a slot throughout the axial extent thereof of sufficient width to provide for the circumferential compressibility, said bolt positioned so that the full shank length is in bearing and said collar is uncompressed;

and a nut turned onto said self-retained bolt and holding said self-retained bolt in clamping engagement.

8. A fastener assembly according to claim 5 wherein the counterbore is of a depth such that the bearing face of the installed nut can bear against a workpiece without circumferentially compressing the collar.

9. A self-retained bolt assembly including a bolt having a threaded shank and an enlarged head and a circumferentially compressible spring collar carried by said bolt in an annular groove positioned at or adjacent the thread runout, the bolt diameter along the groove being less than the shank diameter, the external surface of the collar including first and second frusto conic sections positioned base to base with said first frusto conic section having a steeper taper than said second frusto conic section, said first frusto conic section having a top defining an edge of said collar which is presented toward the bolt head and said second frusto conic section having a top defining a second edge of said collar which is presented toward the bolt threads, the diameters of said tops of said frusto conic sections being equal to each other and when the collar is uncompressed being equal to or slightly less than the bolt shank diameter, the bore diameter of the uncompressed collar being larger than the groove diameter but smaller than the major thread diameter, the maximum external diameter of the uncompressed collar being greater than the shank diameter, the maximum external diameter of the circumferentially compressed collar is no greater than the shank diameter, and said collar having a slot throughout the axial extent thereof of sufficient width to provide for the circumferential compressibility.

References Cited

UNITED STATES PATENTS

| | | | |
|---|---|---|---|
| 1,572,770 | 2/1926 | Colley | 151—69 |
| 1,649,525 | 11/1927 | Herold | 85—8.8 X |
| 3,180,390 | 4/1965 | Ockert | 151—69 |

RAMON S. BRITTS, Primary Examiner

U.S. Cl. X.R.

85—8.8